(12) United States Patent
Esswie

(10) Patent No.: US 12,739,695 B2
(45) Date of Patent: Sep. 15, 2026

(54) PURPOSE DRIVEN CONFIGURED GRANT SCHEDULING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 350 days.

(21) Appl. No.: 18/331,822

(22) Filed: Jun. 8, 2023

(65) Prior Publication Data

US 2024/0414585 A1 Dec. 12, 2024

(51) Int. Cl.
*H04W 28/02* (2009.01)
*H04W 72/1268* (2023.01)
(Continued)

(52) U.S. Cl.
CPC ... *H04W 28/0268* (2013.01); *H04W 72/1268* (2013.01)

(58) Field of Classification Search
CPC ......... H04W 28/0268; H04W 72/1268; H04W 72/543; H04W 72/23
(Continued)

(56) References Cited

U.S. PATENT DOCUMENTS

2021/0258853 A1* 8/2021 Wang .................... H04W 36/22
2022/0417972 A1* 12/2022 Rossbach ............. H04W 72/20
(Continued)

FOREIGN PATENT DOCUMENTS

WO 2021/253207 12/2021
WO 2023/081152 5/2023
WO WO-2024211522 A1 * 10/2024 ............ H04W 72/23

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Xuan Lu
(74) *Attorney, Agent, or Firm* — Amin, Turocy & Watson, LLP

(57) ABSTRACT

A radio access network node may configure one or more user equipment with multiple configured grant resource patterns and multiple corresponding transmission configuration information sets. A user equipment may transmit a traffic indication comprising a traffic characteristic indication to the node corresponding to traffic that the user equipment may transmit to the node. The node may determine traffic characteristics corresponding to the traffic during establishment of a communication session with the user equipment. Based on the traffic characteristics, the node may generate and transmit to the user equipment a configured grant configuration indication message comprising indications of multiple configured grant resource patterns and corresponding transmission configuration information sets usable by the user equipment to transmit uplink traffic. The user equipment may transmit multiple uplink traffic flows according to the indicated multiple configured grant resource patterns and corresponding transmission configuration information sets.

20 Claims, 15 Drawing Sheets

(51) Int. Cl.
*H04W 72/23* (2023.01)
*H04W 72/543* (2023.01)

(58) Field of Classification Search
USPC .......................................................... 370/230
See application file for complete search history.

(56) References Cited

U.S. PATENT DOCUMENTS

| | | | | |
|---|---|---|---|---|
| 2023/0309136 | A1* | 9/2023 | Ahmad | H04W 72/1221 |
| 2024/0196377 | A1* | 6/2024 | Vangala | H04W 28/0268 |
| 2024/0422621 | A1* | 12/2024 | Rao | H04L 65/403 |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

International Search Report and Written Opinion mailed Feb. 20, 2024 for PCT Application No. PCT/US2023/036191, 14 pages.

Nokia et al: "LCP restrictions with multiple CG configurations", 3GPP Draft; R2-1909495 LCP Restrictions for Multiple CG, RAN WG2, No. Prague, Czech Republic; Aug. 15, 2019, [http://www.3gpp.org/ftp/tsg_ran/WG2_RL 2/TSGR2_107/Docs/R2-1909495.zip] 3 pages.

Notification Concerning Transmittal of International Preliminary Report on Patentability for PCT Application No. PCT/US2023/036191 mailed Dec. 18, 2025, 7 pages.

European Office Action mailed Jan. 15, 2026 for European Patent Application No. 23813925.7, 3 pages.

* cited by examiner

100
CORE NETWORK 130
INTERNET SERVICES 150
140
145
145
105
105
105
110
110
110
110
115
115
115
115
115
116
117
118
120
120
120
125
125
125
125
125
135
135
135
135
137

300
125
105
305J
305H-I
305A-C
305D-G
306
307
308
1
2
3
4
115J
115 C
115B
115A
115E
115 D
115 G
115F
115 H
115I
117
118
119
315
320
325

| | Configured grant pattern indication | Timing & frequency resource information and periodicity |
| --- | --- | --- |
| A | CG0 | $x_1$ |
| B | CG1 | $x_2$ |
| | .. | .. |
| n | CGn | $x_n$ |

| | Transmission configuration set (TCS) | Timing and frequency resource information |
|---|---|---|
| A → | TCS0 | $y_1$=[target bandwidth part ID, modulation and coding scheme (MCS), number of uplink antenna streams over the indicated CG occasion, transmission mode indication of either spatial diversity or transmission repetition or spatial multi-stream transmissions, retransmission mode indication in terms of an activation/deactivation indication] |
| B → | TCS1 | $y_2$ |
| | : | : |
| n → | TCSn | $y_n$ |

Figure 9:
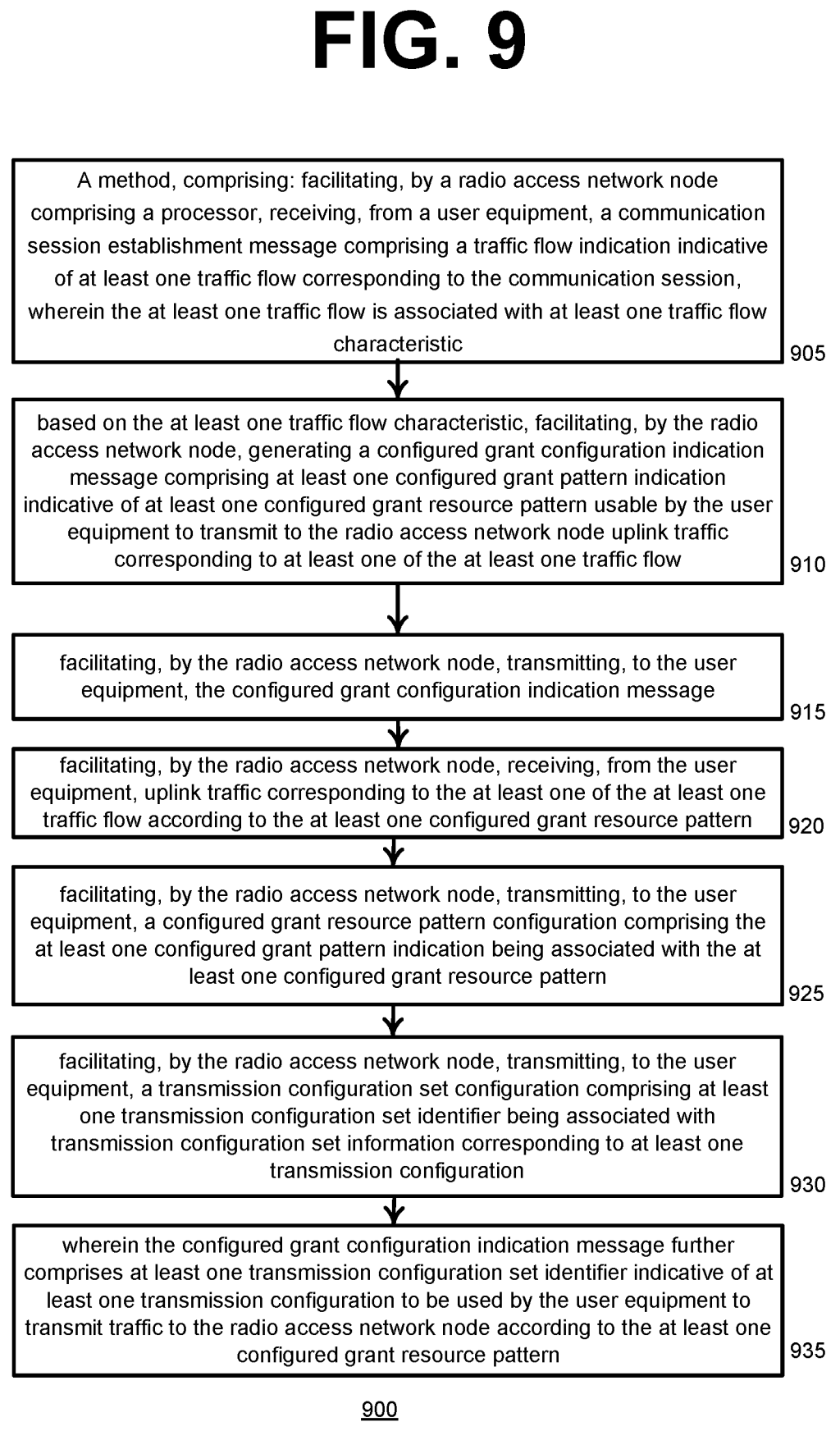

A method, comprising: facilitating, by a radio access network node comprising a processor, receiving, from a user equipment, a communication session establishment message comprising a traffic flow indication indicative of at least one traffic flow corresponding to the communication session, wherein the at least one traffic flow is associated with at least one traffic flow characteristic

905 based on the at least one traffic flow characteristic, facilitating, by the radio access network node, generating a configured grant configuration indication message comprising at least one configured grant pattern indication indicative of at least one configured grant resource pattern usable by the user equipment to transmit to the radio access network node uplink traffic corresponding to at least one of the at least one traffic flow

910 facilitating, by the radio access network node, transmitting, to the user equipment, the configured grant configuration indication message

915 facilitating, by the radio access network node, receiving, from the user equipment, uplink traffic corresponding to the at least one of the at least one traffic flow according to the at least one configured grant resource pattern

920 facilitating, by the radio access network node, transmitting, to the user equipment, a configured grant resource pattern configuration comprising the at least one configured grant pattern indication being associated with the at least one configured grant resource pattern

925 facilitating, by the radio access network node, transmitting, to the user equipment, a transmission configuration set configuration comprising at least one transmission configuration set identifier being associated with transmission configuration set information corresponding to at least one transmission configuration

930 wherein the configured grant configuration indication message further comprises at least one transmission configuration set identifier indicative of at least one transmission configuration to be used by the user equipment to transmit traffic to the radio access network node according to the at least one configured grant resource pattern

A radio access network node, comprising: a processor configured to: receive, from a user equipment, a traffic flow indication indicative of at least one traffic flow corresponding to a communication session between the user equipment and the radio access network node, wherein the at least one traffic flow is associated with at least one traffic flow characteristic

1005

based on the at least one traffic flow characteristic, transmit, to the user equipment, a configured grant configuration indication message comprising at least one configured grant pattern indication indicative of at least one configured grant resource pattern usable by the user equipment to transmit to the radio access network node uplink traffic corresponding to the at least one traffic flow

1010

receive, from the user equipment, uplink traffic corresponding to the at least one traffic flow according to the at least one configured grant resource pattern

1015 transmit, to the user equipment, a configured grant configuration comprising a configured grant resource pattern configuration that comprises the at least one configured grant pattern indication being associated with the at least one configured grant resource pattern and a transmission configuration set configuration comprising at least one transmission configuration set identifier being associated with transmission configuration set information corresponding to at least one transmission configuration

1020

wherein the at least one traffic flow comprises multiple traffic flows, and wherein the configured grant configuration comprises multiple configured grant pattern indications indicative of multiple corresponding configured grant resource patterns usable by the user equipment to transmit to the radio access network node uplink traffic corresponding to the multiple traffic flows

Figure 11:
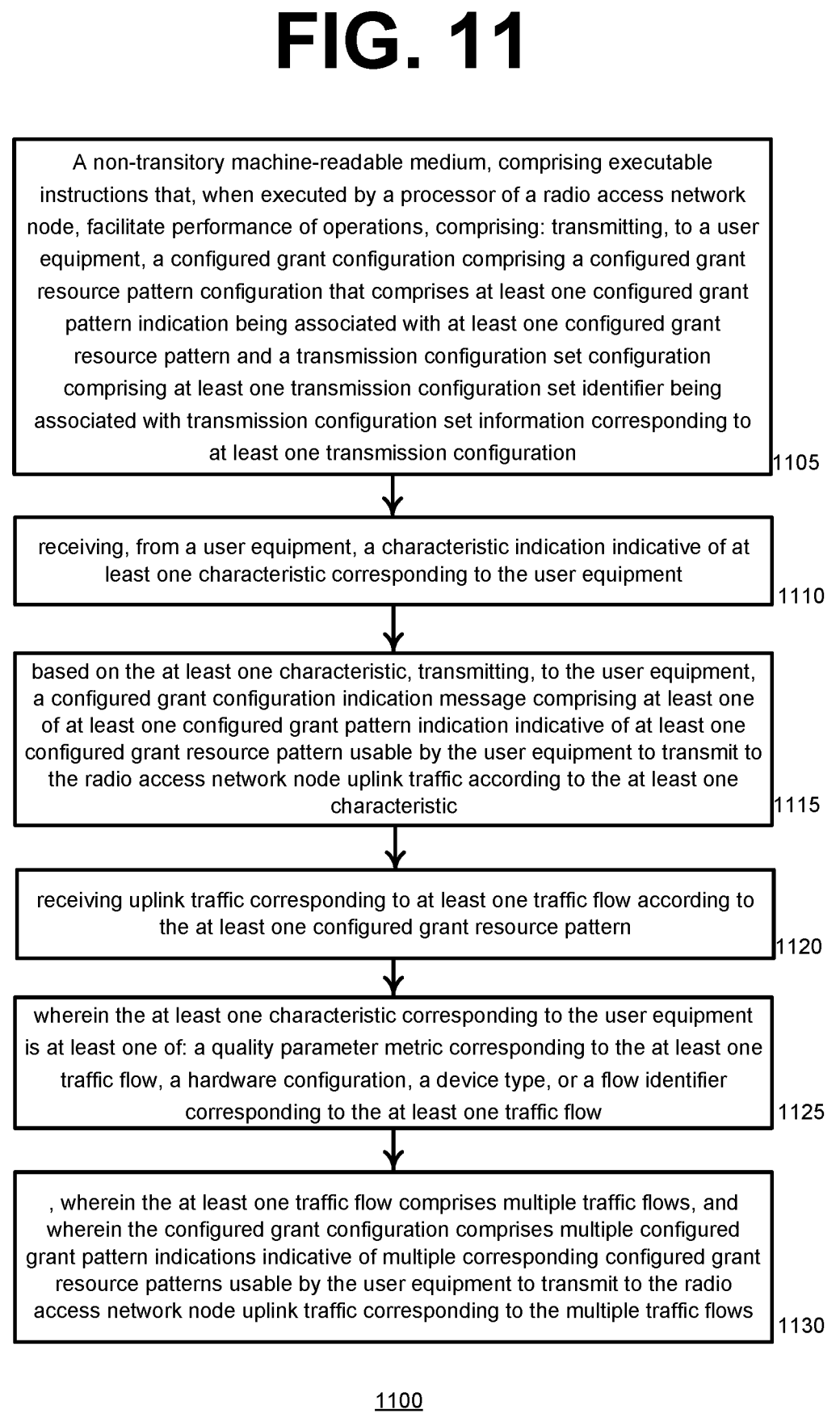

A non-transitory machine-readable medium, comprising executable instructions that, when executed by a processor of a radio access network node, facilitate performance of operations, comprising: transmitting, to a user equipment, a configured grant configuration comprising a configured grant resource pattern configuration that comprises at least one configured grant pattern indication being associated with at least one configured grant resource pattern and a transmission configuration set configuration comprising at least one transmission configuration set identifier being associated with transmission configuration set information corresponding to at least one transmission configuration

1105 receiving, from a user equipment, a characteristic indication indicative of at least one characteristic corresponding to the user equipment

1110 based on the at least one characteristic, transmitting, to the user equipment, a configured grant configuration indication message comprising at least one of at least one configured grant pattern indication indicative of at least one configured grant resource pattern usable by the user equipment to transmit to the radio access network node uplink traffic according to the at least one characteristic

1115 receiving uplink traffic corresponding to at least one traffic flow according to the at least one configured grant resource pattern

1120 wherein the at least one characteristic corresponding to the user equipment is at least one of: a quality parameter metric corresponding to the at least one traffic flow, a hardware configuration, a device type, or a flow identifier corresponding to the at least one traffic flow

1125

, wherein the at least one traffic flow comprises multiple traffic flows, and wherein the configured grant configuration comprises multiple configured grant pattern indications indicative of multiple corresponding configured grant resource patterns usable by the user equipment to transmit to the radio access network node uplink traffic corresponding to the multiple traffic flows

1130

1100

1400

PURPOSE DRIVEN CONFIGURED GRANT SCHEDULING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, receiving, from a user equipment, a communication session establishment message comprising a traffic flow indication indicative of at least one traffic flow corresponding to the communication session, wherein the at least one traffic flow is associated with at least one traffic flow characteristic. Based on the at least one traffic flow characteristic, the method may further comprise facilitating, by the radio access network node, generating a configured grant configuration indication message comprising at least one configured grant pattern indication indicative of at least one configured grant resource pattern usable by the user equipment to transmit to the radio access network node uplink traffic corresponding to at least one of the at least one traffic flow. The method may further comprise facilitating, by the radio access network node, transmitting, to the user equipment, the configured grant configuration indication message, and facilitating, by the radio access network node, receiving, from the user equipment, uplink traffic corresponding to the at least one of the at least one traffic flow according to the at least one configured grant resource pattern.

In an embodiment, the method may further comprise facilitating, by the radio access network node, transmitting, to the user equipment, a configured grant resource pattern configuration comprising the at least one configured grant pattern indication being associated with the at least one configured grant resource pattern.

In an embodiment, the method may further comprise facilitating, by the radio access network node, transmitting, to the user equipment, a transmission configuration set configuration comprising at least one transmission configuration set identifier being associated with transmission configuration set information corresponding to at least one transmission configuration.

In an embodiment, the transmission configuration set information may comprise at least one of: a target bandwidth part identifier corresponding to a bandwidth part to be used for transmission of the uplink traffic corresponding to the at least one of the at least one traffic flow according to the to the at least one configured grant resource pattern, a default modulation and coding scheme, a number of uplink antenna streams to be used to transmit the at least one of the at least one traffic flow, a spatial diversity transmission mode indication indicative of a spatial diversity to be used to transmit the at least one of the at least one traffic flow, a transmission repetition transmission mode indication indicative of a transmission repetition scheme to be used to transmit the at least one of the at least one traffic flow, a spatial multi-stream transmission mode indication indicative of a spatial multi-stream transmission scheme to be used to transmit the at least one of the at least one traffic flow, or a retransmission mode indication indicative of a retransmission scheme to be used to transmit the at least one of the at least one traffic flow.

In an embodiment, the at least one traffic flow may comprise multiple traffic flows. The configured grant configuration may comprise multiple configured grant pattern indications indicative of multiple corresponding configured grant resource patterns usable by the user equipment to transmit to the radio access network node uplink traffic corresponding to the multiple traffic flows.

In an embodiment, the configured grant configuration indication message may further comprise at least one transmission configuration set identifier indicative of at least one transmission configuration to be used by the user equipment to transmit traffic to the radio access network node according to the at least one configured grant resource pattern.

In an embodiment, the configured grant resource pattern configuration may further comprise at least one traffic flow identifier, corresponding to the at least one of the at least one traffic flow, being associated with the at least one configured grant resource pattern. The at least one traffic flow identifier being associated with the at least one configured grant resource pattern may be indicative that the at least one configured grant resource pattern is to be used by the user equipment to transmit uplink traffic corresponding to the at least one traffic flow identifier.

In an embodiment, the configured grant resource pattern configuration may further comprise at least one quality of service class indication, corresponding to the at least one of the at least one traffic flow, being associated with the at least one configured grant resource pattern. The at least one quality of service class indication being associated with the at least one configured grant resource pattern may be indicative that the at least one configured grant resource pattern is to be used by the user equipment to transmit uplink traffic corresponding to the at least one quality of service class indication.

In another example embodiment, a radio access network node may comprise a processor configured to receive, from a user equipment, a traffic flow indication indicative of at least one traffic flow corresponding to a communication session between the user equipment and the radio access network node. The at least one traffic flow may be associated with at least one traffic flow characteristic. The processor may be further configured to, based on the at least one traffic flow characteristic, transmit, to the user equipment, a configured grant configuration indication message comprising at least one configured grant pattern indication indicative of at least one configured grant resource pattern usable by the user equipment to transmit to the radio access network node uplink traffic corresponding to the at least one traffic flow. The processor may be configured to receive, from the user equipment, uplink traffic corresponding to the at least one traffic flow according to the at least one configured grant resource pattern.

In an embodiment, the processor may be further configured to transmit, to the user equipment, a configured grant configuration. The configured grant configuration may comprise a configured grant resource pattern configuration that comprises the at least one configured grant pattern indication being associated with the at least one configured grant resource pattern. The configured grant configuration may comprise a transmission configuration set configuration comprising at least one transmission configuration set identifier being associated with transmission configuration set information corresponding to at least one transmission configuration.

The configured grant configuration may comprise the at least one traffic flow may comprise multiple traffic flows. The configured grant configuration may comprise multiple configured grant pattern indications indicative of multiple corresponding configured grant resource patterns usable by the user equipment to transmit to the radio access network node uplink traffic corresponding to the multiple traffic flows.

In an embodiment, the configured grant configuration indication message may further comprise at least one transmission configuration set identifier indicative of at least one transmission configuration to be used by the user equipment to transmit traffic to the radio access network node according to the at least one configured grant resource pattern.

In an embodiment, the configured grant resource pattern configuration may further comprise at least one traffic flow identifier, corresponding to the at least one traffic flow, being associated with the at least one configured grant resource pattern. The at least one traffic flow identifier being associated with the at least one configured grant resource pattern may be indicative that the at least one configured grant resource pattern is to be used by the user equipment to transmit uplink traffic corresponding to the at least one traffic flow identifier.

In an embodiment, the configured grant resource pattern configuration may further comprise at least one quality of service class indication, corresponding to the at least one of the at least one traffic flow, being associated with the at least one configured grant resource pattern. The at least one quality of service class indication being associated with the at least one configured grant resource pattern may be indicative that the at least one configured grant resource pattern is to be used by the user equipment to transmit uplink traffic corresponding to the at least one quality of service class indication.

In yet another example embodiment, a non-transitory machine-readable medium may comprise executable instructions that, when executed by a processor of a radio access network node, facilitate performance of operations, comprising transmitting, to a user equipment, a configured grant configuration comprising a configured grant resource pattern configuration that comprises at least one configured grant pattern indication being associated with at least one configured grant resource pattern and a transmission configuration set configuration comprising at least one transmission configuration set identifier being associated with transmission configuration set information corresponding to at least one transmission configuration. The operations may further comprise receiving, from a user equipment, a characteristic indication indicative of at least one characteristic corresponding to the user equipment. Based on the at least one characteristic, the operations may further comprise transmitting, to the user equipment, a configured grant configuration indication message comprising at least one of at least one configured grant pattern indication indicative of at least one configured grant resource pattern usable by the user equipment to transmit to the radio access network node uplink traffic according to the at least one characteristic. The operations may comprise receiving uplink traffic corresponding to at least one traffic flow according to the at least one configured grant resource pattern.

In an embodiment, the at least one characteristic corresponding to the user equipment may be at least one of: a quality parameter metric corresponding to the at least one traffic flow, a hardware configuration, a device type, or a flow identifier corresponding to the at least one traffic flow.

In an embodiment, the at least one traffic flow may comprise multiple traffic flows. The configured grant configuration may comprise multiple configured grant pattern indications indicative of multiple corresponding configured grant resource patterns usable by the user equipment to transmit to the radio access network node uplink traffic corresponding to the multiple traffic flows. The characteristic indication may be indicative of the at least one characteristic corresponding to an anything reality application being executed by the user equipment. The configured grant configuration indication message may be indicative that different configured grant resource patterns of the multiple configured grant resource patterns are to be used by the user equipment to transmit, to the radio access network node, respectively corresponding different traffic flows of the multiple traffic flows. The configured grant configuration further may further comprise multiple transmission configuration set indications of the at least one transmission configuration set indication indicative that the multiple transmission configuration set indications are to be used by the user equipment to transmit the different traffic flows of the multiple traffic flows to the radio access network node. The configured grant resource pattern configuration may further comprise different quality-of-service class indications being associated with the multiple configured grant resource patterns, wherein the configured grant configuration indication message is indicative that different configured grant resource patterns of the multiple configured grant resource patterns are to be used by the user equipment to transmit different traffic flows of the multiple traffic flows to the radio access network node based on correspondence of the different traffic flows to the different quality-of-service class indications.

BRIEF DESCRIPTION OF THE DRAWINGS

FIG. 4 illustrates an example configured grant resource pattern configuration.

FIG. 5 illustrates an example transmission configuration with multiple transmission configuration sets associated with corresponding configured grant resource pattern identifiers.

FIG. 9 illustrates a block diagram of an example method embodiment.

FIG. 10 illustrates a block diagram of an example radio access network node.

FIG. 11 illustrates a block diagram of an example non-transitory machine-readable medium embodiment.

DETAILED DESCRIPTION OF THE DRAWINGS

Figure 1:
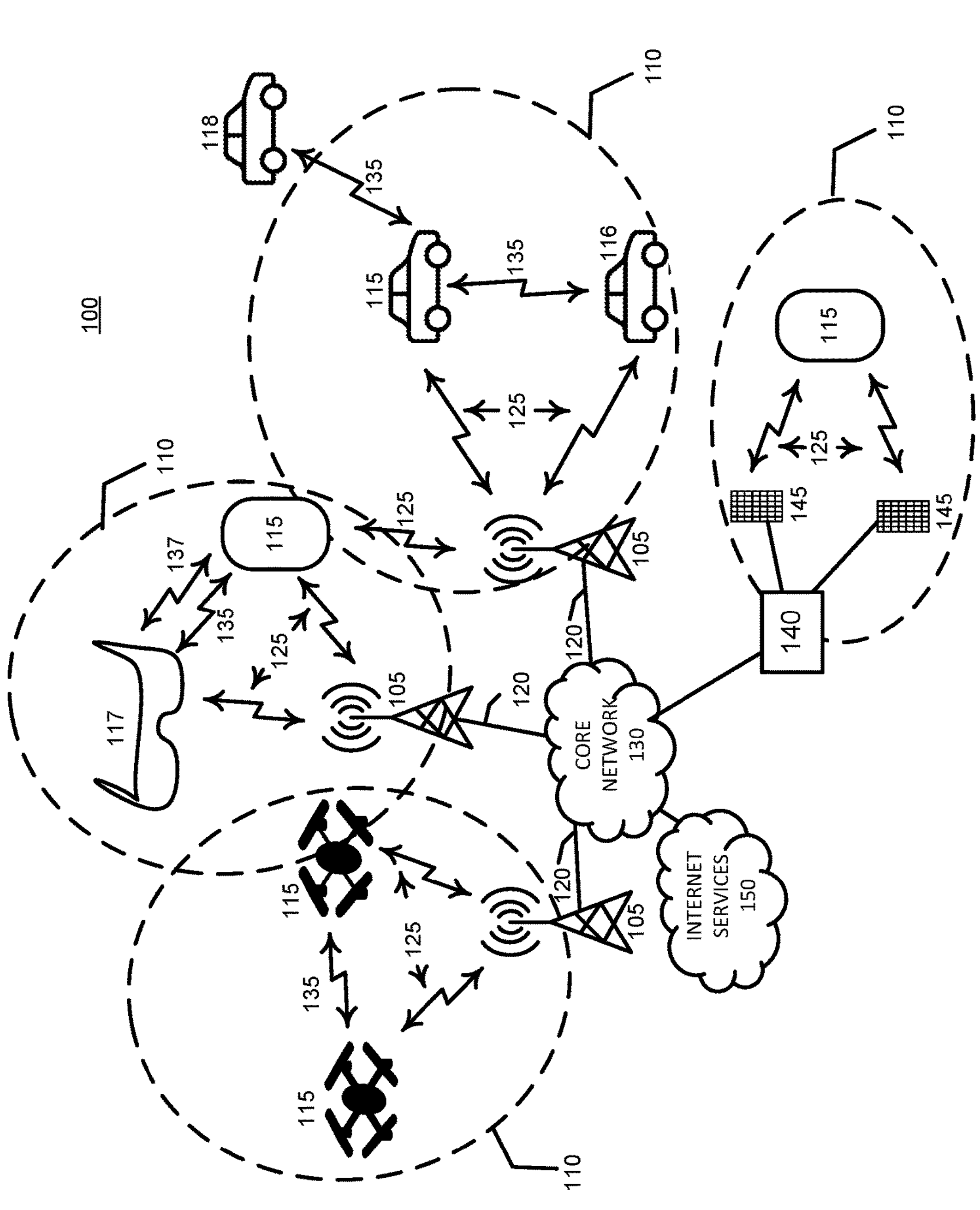
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate, but may also be sporadic, or bursty, in nature. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic while minimizing power consumption.

Configured Grant Scheduling

Configured grant ("CG") uplink scheduling facilitates transmitting uplink traffic for services that require low scheduling delays. With CG scheduling, a RAN node may configure a user equipment with, and a user equipment may use, configured grant occasions that are configured according to multiple sets of periodic timing and frequency uplink resources. Configured grant occasions may facilitate transmission of latency-critical uplink traffic. Such periodic CG occasions may be referred to as a CG pattern, or patterns. Thus, a user equipment device, configured with a CG scheduling occasion, can transmit uplink traffic according to a configured CG resource set without waiting to request and be granted an uplink resource to transmit the traffic. Using CG occasions to transmit uplink traffic is beneficial for user equipment having single traffic flows, or for user equipment having multiple traffic flows that have similar traffic characteristics. A user equipment adopting a static uplink transmission configuration set for all traffic transmitted over each CG occasions may further reduced signaling overhead with reasonable uplink radio performance.

However, for services of multi-purpose multi-flow traffic, (e.g., virtual reality traffic, extended reality traffic, augmented reality traffic, or anything reality traffic) using static CG transmission configurations for all traffic flows may be suboptimal. For example, using a configured CG occasion pattern and a conservative static CG transmission configuration (e.g., low modulation order and strong channel encoding levels) is suitable for devices with critical uplink traffic flows due to enhanced transmission latency and reliability performance associated with using configured grant resources (e.g., less latency because of no waiting to request and be granted uplink resources). In a scenario where a user equipment device configured with a conventional static CG occasion pattern and associated conservative transmission configuration information, and has additional best effort traffic flows (e.g., flows requiring extreme capacity), using the static CG pattern may lead to degradation of spectral efficiency associated with the configured grant resources and may lead to a reduced data rate at the user equipment since all CG traffic is treated the same conservative manner.

CG scheduling is a type of uplink resource scheduling that is optimized for a minimum latency scheduling, which typically suits latency stringent traffic arrivals at a user equipment. With CG scheduling, a RAN node semi-statically configures periodic one or more resource sets or resource occasions for devices to adopt for transmitting stringent-QoS-requirement uplink traffic arrivals. CG resource sets may comprise certain frequency resources, assigned for a certain amount of time, and repeated periodically in time, for user equipment uplink transmissions. Using dynamic scheduling, when user equipment having latency-critical traffic, or a user equipment executing an application corresponding to latency-critical traffic, has uplink packets ready for transmission to a RAN node, the user equipment may immediately transmit the packets during the next available one or more configured CG occasion, thus avoiding traffic buffering delay resulting from the user equipment first requesting a scheduling grant, with an indication of how much uplink traffic it has, then receiving a resource grant, and finally transmitting uplink traffic according to granted resources.

CG scheduling offers fast transmission of uplink packets with less control overhead. However, conventional CG scheduling functions best when the packet arrival rate at the user equipment devices is, or is almost, periodic. For example, for the highest spectral efficiency, a RAN node may align a CG resource occasion periodicity corresponding to a user equipment with an expected packet arrival rate at the user equipment. Thus, CG resource sets or occasions are efficiently used by user equipment with critical traffic to transmit (e.g., there are not many CG occasions unused by the user equipment). Furthermore, a CG resource or occasion may be dedicated to a single user equipment or may be shared among multiple active user equipment devices, where each user equipment may be assigned, by the RAN, an orthogonal scrambling code or preamble to use to modulate traffic uplink. A scrambling code or a preamble may facilitate more than a single user equipment device transmitting respective uplink payload simultaneously over the same CG resource occasion. Thus, with orthogonal preamble modulation of uplink traffic corresponding to a user equipment device, a RAN node can distinguish and decode different traffic streams from different transmitting user equipment devices.

Unlike full dynamic scheduling, where dynamic transmission configurations are requested and granted for downlink or uplink transmission, CG scheduling adopts a static transmission configuration for a CG pattern (e.g., a set of CG resource occasions with a certain CG resource set structure and periodicity). The terminology "transmission configuration" may refer to a set of radio configurations and radio handling aspects that a transmitter has adopted for transmitting payload towards an intended receiver.

Conventional CG scheduling facilitates low latency uplink traffic transmissions by pre-granting (e.g., before a user equipment has traffic to transmit) multiple uplink resource occasions to active user equipment, where resource occasions may correspond to certain granted timing and frequency resources that may be repeated periodically. Furthermore, a user equipment device is configured, according to conventional techniques, to adopt the same configured CG periodic occasion pattern for all transmissions that use configured grant occasions to transmit uplink traffic, thus facilitating a RAN node in being aware of how and when a user equipment may have traffic payload to transmit in the uplink direction.

Using conventional static configured grants is suitable for single flow traffic and/or multi flow traffic where all flows share common radio quality of service requirements (e.g., a user equipment transmits all its traffic and associated traffic flows using an CG occasion pattern and the same radio transmission configurations). Thus, for example, using conventional CG technique for XR traffic comprising concurrent low latency flows and high-capacity flows, both flows will be handled the same way. Specifically, a low latency and high reliability traffic flow can be handled with capacity boosting configurations, which may lead to severe latency and reliability degradation and vice versa. Thus, embodiments disclosed herein adapt different transmission configurations corresponding to different CG resource patterns, depending on radio requirements of traffic flows. Embodiments disclosed herein enable dynamic association of multiple transmission configuration sets with CG occasions for carrying certain traffic flows, and thus facilitates similar flexibility of full dynamic scheduling without the added delay and signaling overhead of dynamic control channel signaling.

Embodiments disclosed herein facilitate purpose driven configured grant scheduling where the reduced signaling overhead of baseline/conventional CG scheduling is retained, but with adaptive tuning of CG transmission configuration parameters and pattern(s) according to the type/nature of uplink traffic flow(s), which traffic may be transmitted via different CG resource sets or occasions. Embodiments disclosed herein may comprise CG scheduling procedures that semi-statically define multiple transmission configuration sets, where each of one or more transmission configuration sets is associated with transmission configuration information that is suitable for a certain traffic type and target radio requirements. Thus, according to embodiments disclosed herein, a RAN node may dynamically configure user equipment devices with multiple CG occasion patterns, where each pattern is associated with a certain transmission configuration set and is to be used to carry certain uplink traffic flows having quality-of-service ("QoS") targets/requirements to which the corresponding CG-occasion-specific transmission configurations are tailored. For example, a latency/reliability transmission configuration set optimized to minimize latency and maximize reliability may be associated with, and adopted for use with, a CG occasion pattern that is configured to carry latency and reliability traffic flows, thus satisfying, and being tuned to, or matched to, stringent latency/reliability QoS targets. Accordingly, embodiments disclosed herein may facilitate dynamic CG scheduling flexibility (e.g., to meet different requirements of multi-traffic flow transmissions of various QoS targets) while preserving low signaling overhead and low latency of CG scheduling associated with use of configured grants to transmit uplink traffic instead of using fully dynamic scheduling which requires back and forth downlink/uplink control channel signaling exchanges before traffic can be transmitted.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
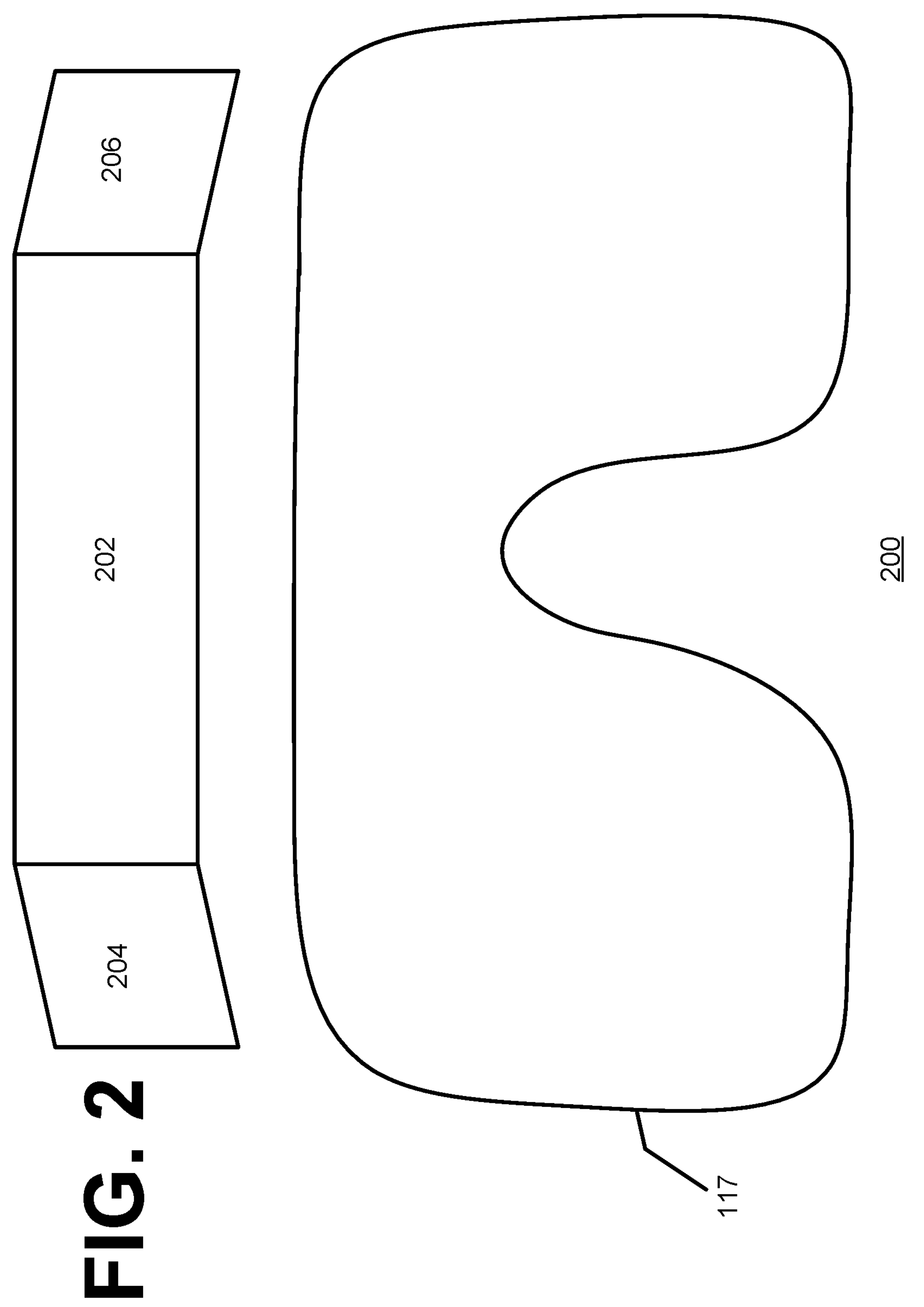
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g. latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Figure 3:
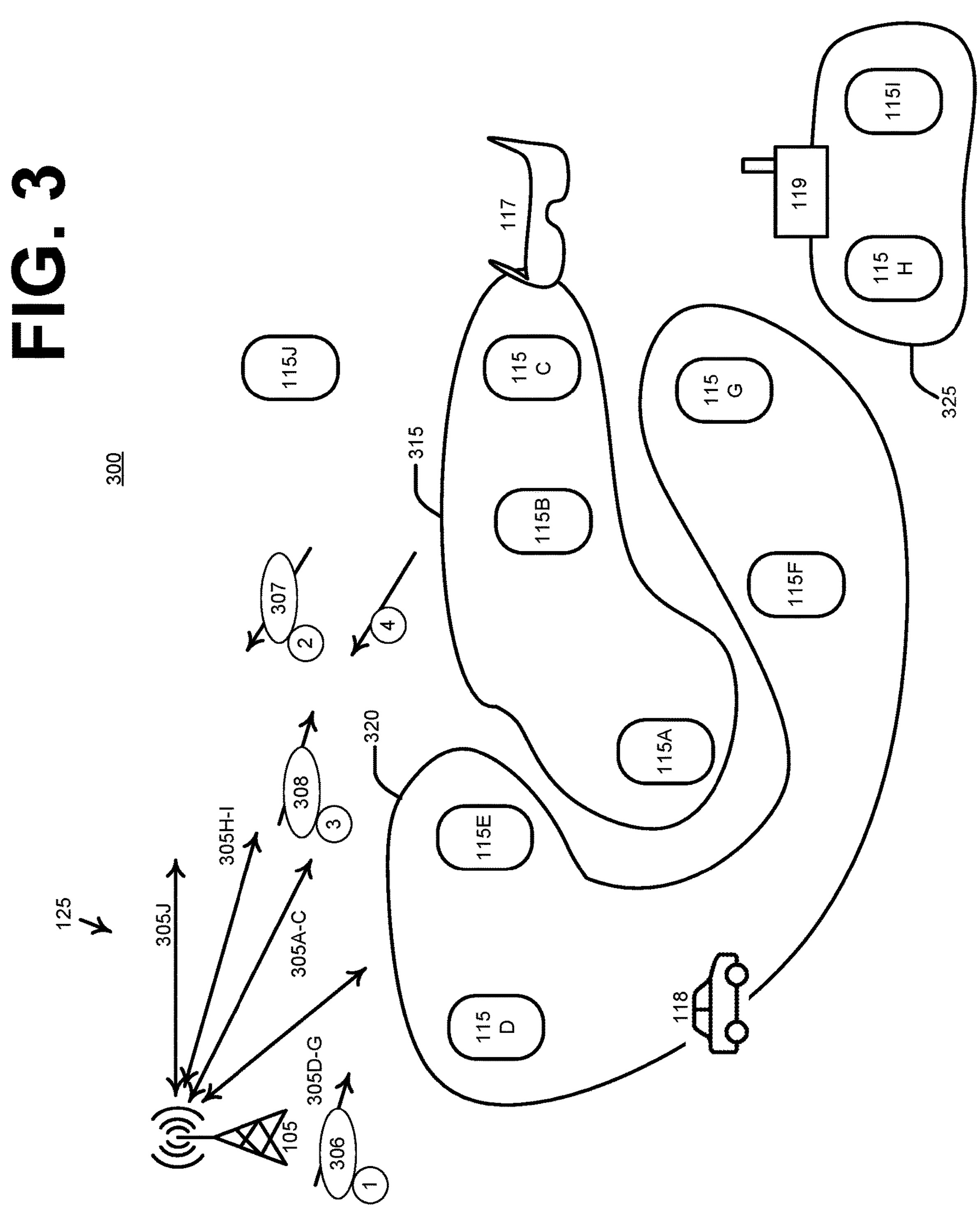
FIG. 3 illustrates an example environment with multiple user equipment in multiple groups of user equipment.

Turning now to FIG. 3, the figure illustrates an example environment 300 with multiple user equipment 115 in multiple user equipment groups 315, 320, and 325. Group 315 may comprise user equipment 115A, 115B, and 115C. User equipment of group 315 may be grouped together because they may operate communication sessions 305A-C that may comprise traffic corresponding to XR sessions, as represented by XR appliance 117 being associated with group 315. Group 320 may comprise user equipment 115D, 115E, 115F, and 115G. User equipment of group 320 may conduct communication sessions 305D-G with radio access network node 105 that comprise traffic to and from one or more vehicles, as represented by XR vehicle 118 being associated with group 320. Communication session traffic 305D-G with RAN 105 corresponding to a vehicle 118 may be sporadic but may be critical when resources are needed to transmit the traffic (e.g., a crash notification). User equipment of group 325 may conduct communication sessions 305H-I with radio access network node 105 that comprise traffic to and from one or more machine-to-machine devices in a factory, as represented by industry 118 being associated with group 325. User equipment 115J may conduct a communication session 305J with RAN 105. Traffic corresponding to groups 315, 320, and 325 and traffic corresponding to UE 115J may have different characteristics, such as, for example, different latency requirements, different data rates, different reliability requirements, and the like. Accordingly, radio access network node 105 may configure user equipment 115J, and user equipment of groups 315, 320, and 325 with different configured grant resource patterns based on the different traffic characteristics corresponding to the different user equipment or user equipment groups.

At act 1, the radio access network node 105 may transmit to one or more user equipment 115 a configured grant resource pattern configuration 306 comprising at least one configured grant pattern indication, or identifier, being associated with the at least one configured grant resource pattern. At act 2, one or more user equipment 115 may transmit to radio access network node 105 a traffic flow indication 307 indicative of at least one traffic flow corresponding to a communication session 305 between the user equipment and the radio access network node. The at least one traffic flow may be associated with at least one traffic flow characteristic. Traffic flow indication 307 may comprise a characteristic indication indicative of the at least one traffic flow characteristic. In response to traffic flow indication 307 transmitted at act 2, user equipment 115J and user equipment of groups 315, 320 and 325 may each be configured at act 3 via a configured grant configuration indication message 308, which may comprise device-specific scrambling codes to use to modulate uplink traffic in case more than one user equipment transmit uplink traffic to RAN 105 at the same time using the same frequency or other transmission configuration information. A configured grant configuration indication message 308 may comprise one or more configured grant pattern indication(s) corresponding to traffic flow characteristic information transmitted from user equipment 115 to RAN 105 via a traffic flow indication 307. Thus, a configured grant configuration indication message 308 may be customized for a particular user equipment based on a characteristic of traffic that the user equipment will be transmitting in the uplink directed, as indicated via traffic flow indication 307.

At act 4, user equipment of one group may transmit to RAN 105 uplink traffic according to different configured grant resource patterns or different transmission configuration information that were configured by RAN 105 at act 1 and that were indicated by a configured grant pattern indication in a configured grant configuration indication message 308. In addition, a communication session 305 corresponding to a user equipment of a group may comprise multiple traffic flows with each of the multiple traffic flows having different traffic characteristics with respect to one another. Thus, a user equipment 115 may use different configured grant resource patterns, indicated in a configured grant configuration indication message 308, or different transmission configuration information indicated in a configured grant configuration indication message 308, to transmit traffic to RAN 105 at act 4.

FIG. 4 illustrates an example configured grant resource pattern configuration 306. Configuration 306 may comprise multiple CG occasion resource pattern information 410. Each CG occasion or pattern information set 410 may be associated in configuration 306 with a configured grant pattern indication, or identifier 405, which may be referred to as an index. Configured grant resource pattern information 410 may comprise certain radio timing and frequency resources, with certain sizes, and corresponding resource repetition periodicity. Different resource pattern information sets 410 may comprise different radio timing, frequency, and periodicity resource information. For example, resource information set 410B may comprise different information than information set 410A. Having different resource information sets 410 in configuration 306 may facilitate support for use of different configured grant patterns (e.g., partners defined by resource pattern information 410) for fast uplink traffic transmission of different sizes. For example, an uplink device of with small-sized uplink payload arrivals can be assigned, via a configured grant pattern indication 405, a resource-limited CG occasion pattern 410 such that CG resources are efficiently utilized. Accordingly, a CG occasion or pattern may be identified, or indicated, in a configured grant configuration indication message, such as message 308 shown in FIG. 3, by a CG index from the list of available CG resource pattern indices 405 shown in FIG. 4. Configuration 306 may be transmitted from a RAN 105 shown in FIG. 3 to a dynamically-configurable-configured-grant-supporting user equipment as part of broadcast SIB message signaling and/or user-equipment-specific RRC connection establishment message signaling.

FIG. 5 illustrates an example transmission configuration 307. Configuration 307 may comprise a list of available transmission configuration set identifiers (TCSs) 505, where each TCS identifier corresponds to user equipment transmission behavior configured via transmission configuration set information 510. For example, configured grant transmission configuration information 510 shown in configuration 307 may comprise a target bandwidth part ("BWP") identifier indicative of a target BWP usable for configured grant occasion which may be associated a transmission configuration. Indicating a BWP identifier in configuration 307 may facilitate a configured grant occasion being shared across multiple BWP if the configured grant is not associated with traffic QoS targets but is associated with devices. For example, an XR device may be configured with a configured grant occasion or pattern that corresponds to a high-capacity BWP, but non-frequent, latency-critical traffic flows corresponding to the XR device may be carried over another configured grant occasion that is associated with a different, latency-optimal BWP. Thus, configured grant occasions may be associated with traffic flows that share common QoS requirements instead of being associated with specific devices or specific BWP.

Configured grant transmission configuration information 510 may comprise default transmission modulation and coding scheme information. configured grant transmission configuration information 510 may comprise a number of supported antenna streams. The number of antenna streams may correspond to a supported rank of an uplink channel for a configured grant. The number of antenna streams may correspond to how many antennas a user equipment is specified to use during a configured grant occasion to transmit uplink payload to a RAN. Configured grant transmission configuration information 510 may comprise a transmission mode indication. A transmission mode indication may be associated in configuration 307 with an uplink diversity (e.g., a user equipment device transmits multiple different versions of the same payload to increase reception reliability), or an uplink spatial diversity (e.g., a user equipment divides available uplink traffic into multiple streams and transmits the streams simultaneously, each from an available uplink antenna port to boost capacity, or data throughput), or a traffic repetition value (e.g., a user equipment transmits the same payload multiple times according to a configured grant occasion to enhance latency and reliability performance). Configured grant transmission configuration information 510 may comprise a transmission mode indication and may comprise a retransmission indication. A retransmission indication may facilitate enabling or disabling retransmissions over a configured grant resource occasion, if a first transmission of an uplink traffic packet was not decoded. A retransmission indication may be beneficial in an example when a configured grant occasion is used to carry best effort traffic or very latency stringent traffic but when payload retransmission is not necessary.

Figure 6:
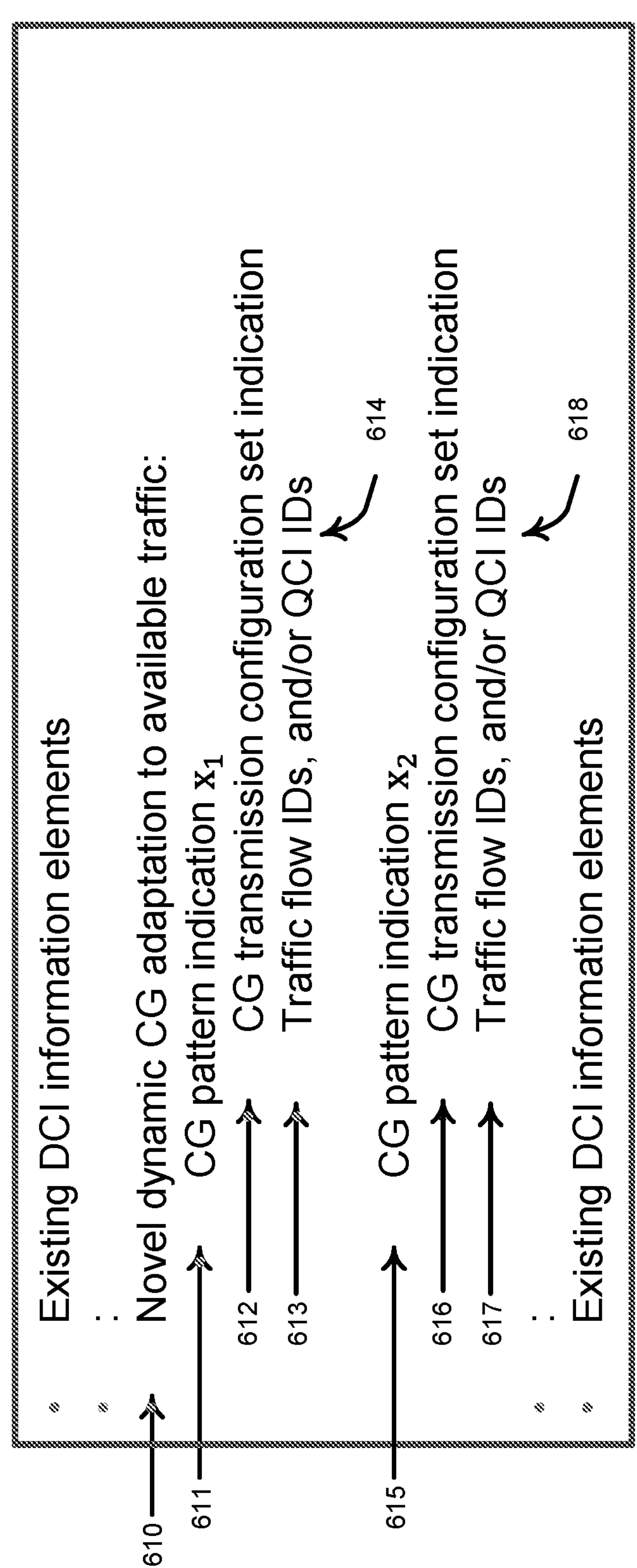
FIG. 6 illustrates an example configured grant configuration indication message.

FIG. 6 illustrates an example configured grant configuration indication message 308. A RAN node may dynamically configure devices with dynamic association information 610 indicating an association between a first CG resource pattern indication 611 (e.g., information 410 or an indication 405 shown in FIG. 4) and corresponding first traffic flow identifiers 613, or first flow priority indications 614. Dynamic association information 610 may comprise an association between first CG resource pattern indication 611 and first CG transmission configuration set 612. Similarly, dynamic association information 610 may comprise an association between a second CG resource pattern indication 615, second CG transmission configuration set 616, and corresponding second flow identifiers 617, or second flow priority indications 618.

Information 610 may be transmitted, or signaled, dynamically by a radio access network node as part of DCI signaling. Multiple CG resource patterns may be configured as being associated with different transmission configurations that may suit various carried traffic flows or traffic priorities better than a conventional static CG resource pattern. Thus, using configurations 306, 307, or 308, a user equipment may be enabled with multiple transmissions behaviors with each being associated with corresponding multiple granted CG resource patterns and transmission configuration information to transmit to a RAN node different traffic flows having different traffic characteristics.

Figure 14:
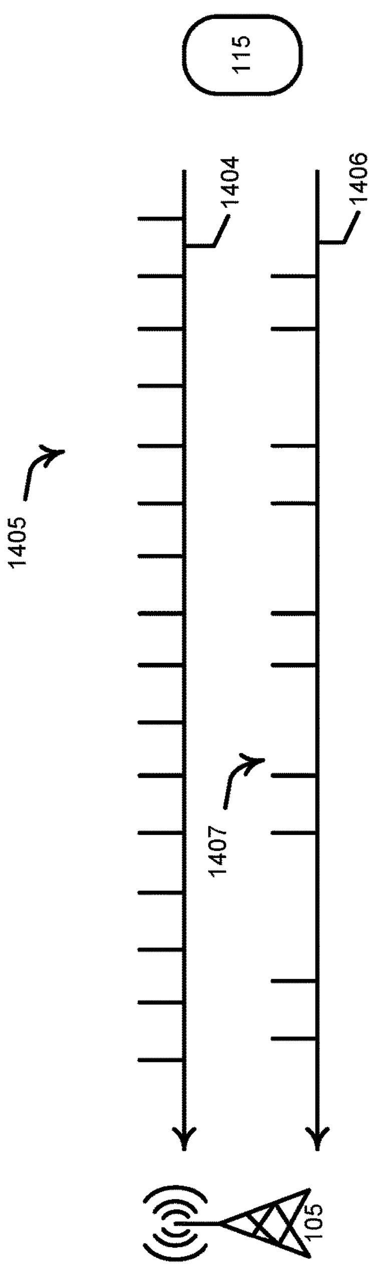
FIG. 14 illustrates multiple uplink traffic flows, having different traffic rates, corresponding to a communication session between a user equipment and a radio access network node.

Turning now to FIG. 14, the figure illustrates multiple uplink traffic flows, having different traffic rates, corresponding to a communication session between a user equipment and a radio access network node. Uplink traffic 1404 is shown with a faster, or denser, data rate 1405 than data rate 1407, which corresponds to uplink traffic 1406.

Figure 15:
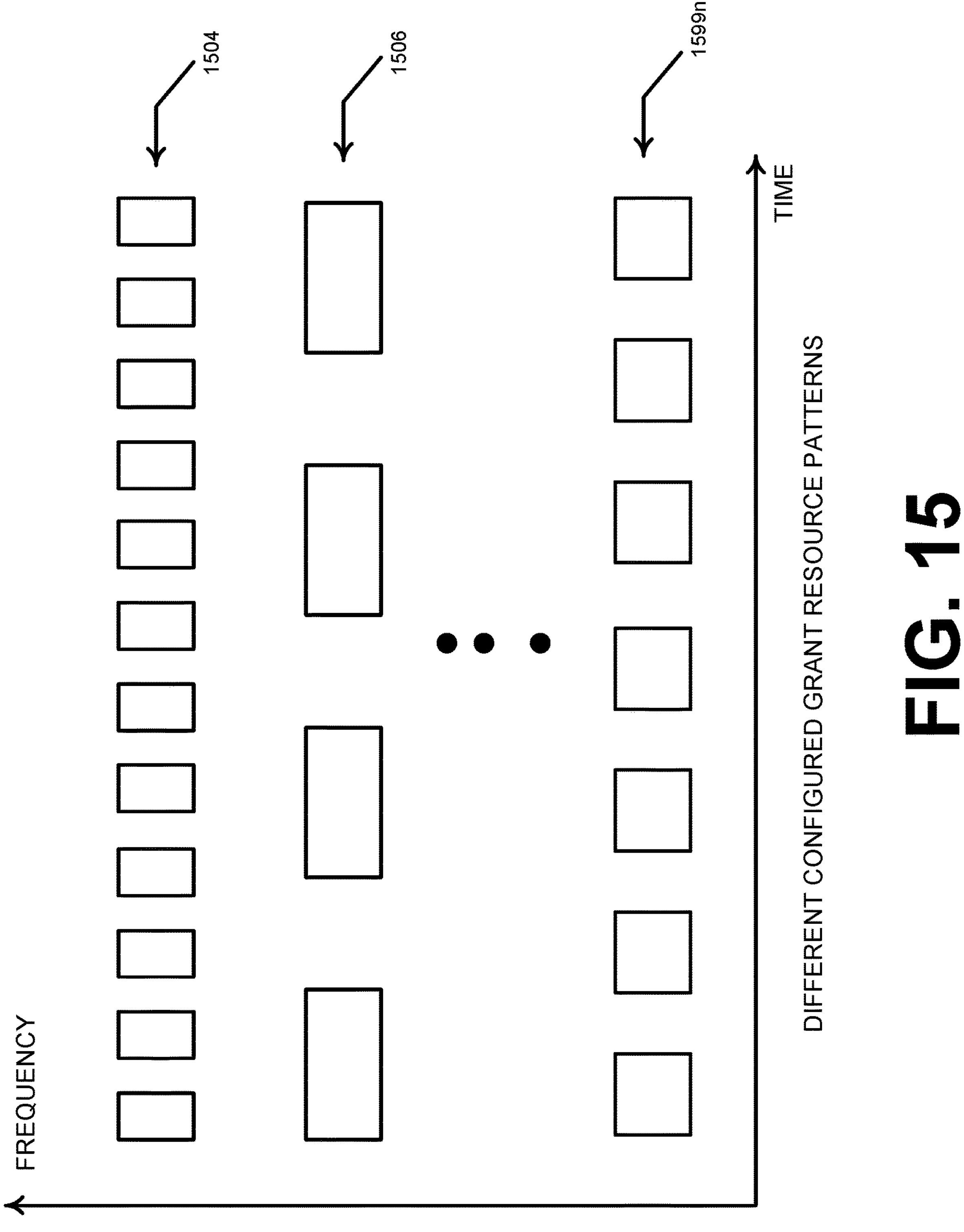
FIG. 15 illustrates a resource diagram showing different configured grant resource patterns.

Turning now to FIG. 15, the figure illustrates a resource diagram 1500 showing different configured grant resource patterns 1504, 1506, . . . **1599*n*. A user equipment may be configured with one or more of configured grant resource patterns 1504, 1506, . . . 1599*n* to facilitate transmitting uplink traffic to a RAN. For example, a user equipment with uplink traffic 1404, shown in FIG. 14, to be transmitted may be configured, via an indication in a configured grant configuration indication message 308 shown in FIG. 6, to use a configured grant resource pattern 1504, shown in FIG. 15, which may have been configured via a configured grant resource pattern configuration 306 shown in FIG. 4. For example, pattern indication 611 in FIG. 6 may comprise configured grant pattern indication CG0 shown in block 405A in FIG. 4, configured grant indication 612 may comprise configuration set identifier TCS0 shown in block 505A of FIG. 5, and traffic flow identifier 613 shown in FIG. 6 may comprise a flow identifier, which may have been transmitted by a user equipment to a RAN node, and packets corresponding to which are to be transmitted form the user equipment to the radio access network node according to pattern resource information shown in block 410A and according to transmission configuration information shown in block 510A of FIG. 5. Similarly, a user equipment with uplink traffic 1406, shown in FIG. 14, to be transmitted may be configured, via an indication in a configured grant configuration indication message 308, to use a configured grant resource pattern 1506, which may comprise resource information shown in block 410B in FIG. 4, which associated indication CG1 in 405B shown in FIG. 4 may be indicated in indication 615 shown in FIG. 6. In the example, the user equipment may transmit traffic 1406, which may be identified in flow identifier field 617, according to transmission configuration information contained in field 510B shown FIG. 5, which corresponding transmission configuration information identifier TCS1 shown in field 505B may be indicated in transmission configuration information field 616 of message 308 shown in FIG. 6**.

Figure 7:
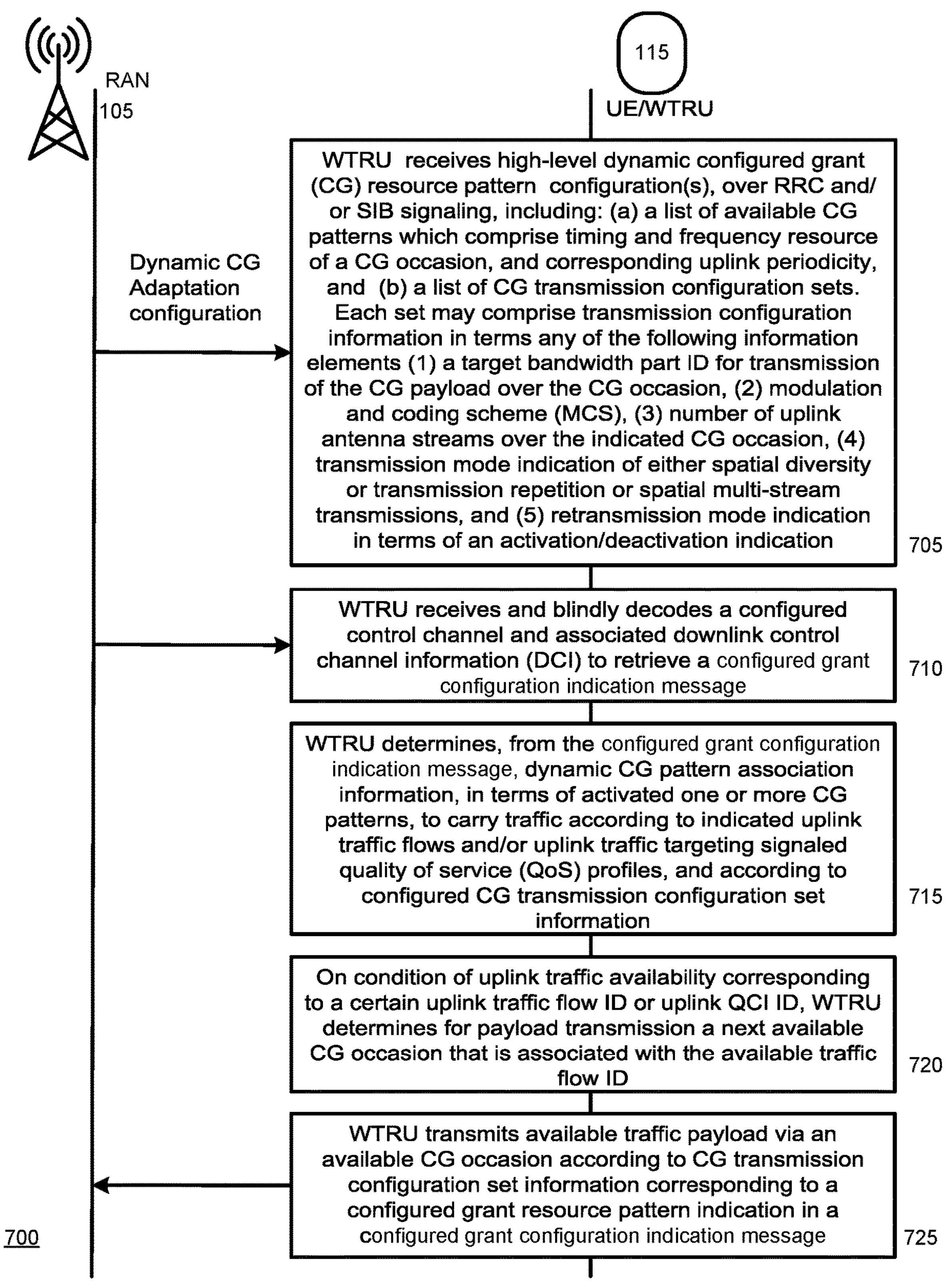
FIG. 7 illustrates a timing diagram of an example embodiment of transmitting an uplink traffic flow using a configured grant resource pattern configured to be usable for the traffic flow based on a characteristic of the traffic flow.

Turning now to FIG. 7, the figure illustrates a timing diagram of an example embodiment method 700. At act 705, UE/WTRU 115 may receive from RAN 105 a high-level dynamic configured grant (CG) scheduling configurations (e.g., configurations 306 or 307) via RRC and/or SIB signaling. Information contained in configurations received at act 705 may comprise (a) a list of available CG pattern information that may define timing and frequency resources, and periodicity, of a dynamically configurable CG occasion, or pattern, and (b) a list of CG transmission configuration set information corresponding top one or more sets, where each set may comprise transmission configuration information in terms any of the following information elements: (1) a target bandwidth part identifier for transmission of uplink payload over a CG pattern occasion, (2) a modulation and coding scheme ("MCS"), (3) a number of uplink antenna streams to use during an indicated CG occasion, (4) a transmission mode indication with respect to spatial diversity, transmission repetition, or spatial multi-stream transmissions, or (5) a retransmission mode indication in terms of an activation/deactivation indication.

At act 710, UE/WTRU 115 may receive from RAN 105 and blindly decode a configured control channel and associated control channel information, which may comprise a configured grant configuration indication message 308 described in reference to FIG. 3 and FIG. 6. At act 715, UE/WTRU may determine from the message received at act 710 dynamic CG pattern association information, in terms of one or more CG patterns, to use to transmit uplink traffic corresponding to traffic flow identifiers and/or uplink traffic targeting signaled quality of service (QoS) profiles, (e.g., QoS class indication ("QCI") identifiers or indices, and corresponding identifiers of associated CG transmission configuration sets).

At act 720, on condition of uplink traffic availability at UE/WTRU 115 corresponding to a certain uplink traffic flow or uplink QCI ID, the UE/WTRU may determine a next available CG occasion for payload transmission that is associated with the available traffic corresponding to a traffic flow identifier indicated in the message received at act 710. At act 725, UE/WTRU 115 may transmit available traffic payload via the determined next available CG occasion, based on a CG transmission configuration set and configured grant resource pattern indicated as being associated with a traffic identifier, corresponding to the traffic, in the message received at act 710.

Figure 8:
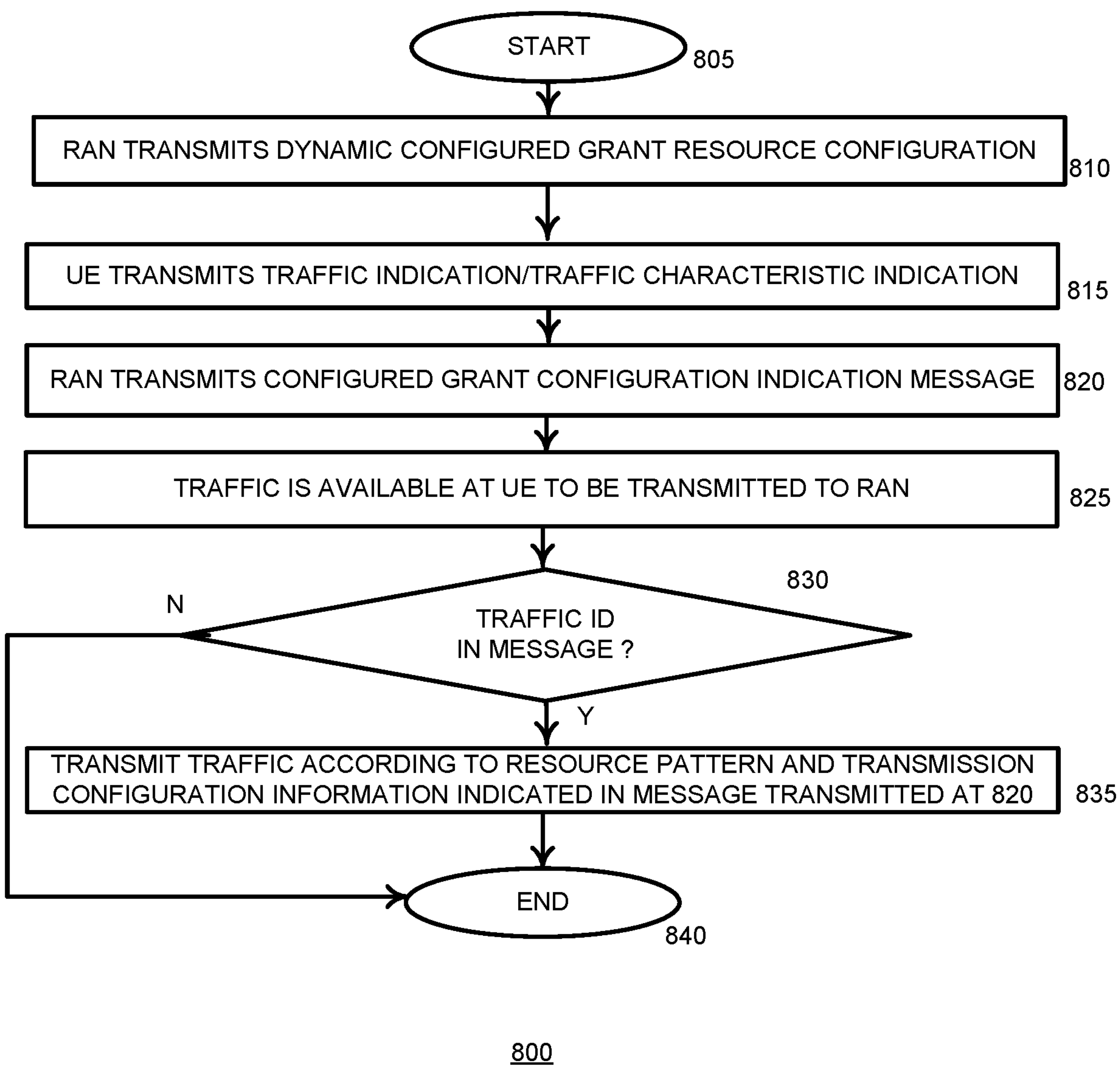
FIG. 8 illustrates a flow diagram of an example embodiment method using different configured grant resource patterns for different uplink traffic flows based on characteristics corresponding to the traffic flows.

Turning now to FIG. 8, the figure illustrates a flow diagram of an example embodiment 800. Method 800 begins at act 805. At act 810, a radio access network node may transmit to one or more user equipment a dynamic configured grant resource configuration. The dynamic configured grant resource configuration may comprise configuration 306 described in reference to FIGS. 3 and 4. The dynamic configure grant resource configuration may comprise transmission configuration information configuration 307 described in reference to FIG. 5. At act 815, one of the one or more user equipment may transmit a traffic indication to the radio access network node. The traffic indication may comprise a traffic characteristic indication, which may indicate, for example, a latency, a reliability, or a capacity requirement corresponding to uplink traffic that may correspond to a communication session that the user equipment may have established with the radio access network node.

At act 820, the radio access network node may transmit a configured grant configuration indication message, for example message 308 described in reference to FIG. 3 and FIG. 6. The configured grant configuration indication message may comprise an indication of a configured grant resource pattern usable by the user equipment to transmit uplink traffic corresponding to a traffic flow indicated to the radio access network node at act 815. The configured grant configuration indication message may comprise configured grant transmission configuration information to use in conjunction with the indicated configured grant resource pattern. The configured grant configuration indication message may comprise a flow identifier, or a quality-of-service class indicator corresponding to the traffic indicated by the user equipment to the radio access network node at act 815. The user equipment may use an indication of a configured grant resource pattern, an indication of a configured grant transmission configuration information corresponding to, or associated with, the indication of the configured grant resource pattern in the message received at act 820, to look up in the configuration received at act 810, configured grant resource pattern information and configured grant transmission configuration information to use to transmit traffic corresponding to a traffic identifier indicated in the message received at act 820.

At act 825, traffic may arrive at, or be available at, the user equipment to be transmitted to the radio access network node. At act 830, the user equipment may determine whether the available uplink traffic corresponds to a traffic characteristic indicated to the radio access network at act 815, or whether the uplink traffic corresponds to a traffic identifier indicated in the message that the radio access network node transmitted at act 820. If a determination is made at act 830 that available traffic to be transmitted by the user equipment to the radio access network node does not correspond to traffic indicated in the message transmitted at act 820 or does not correspond to potential traffic indicated by the user equipment to the radio access network node at act 815, method 800 advances to act 840 and ends.

Returning to description of act 830, if the uplink traffic that became available at act 825 corresponds to a traffic identifier indicated in the configuration indication message transmitted by the radio access network node at act 820 or corresponds to potential traffic indicated to the radio access network node at act 815, method 800 advances to act 835. At act 835, the user equipment may transmit the uplink traffic that became available at act 825 to the radio access network node according to resource pattern and transmission configuration information indicated in the message transmitted by the radio access network node at act 820. It will be appreciated that uplink traffic that becomes available at the user equipment at act 825 may comprise more than one traffic flow, and that the message transmitted by the radio access network node at act 820 may comprise multiple different configured grant resource pattern indications and different transmission configuration information indications to be used for the different uplink traffic flows. Accordingly, the user equipment may transmit traffic corresponding to an uplink traffic flow according to a first configured grant resource pattern and corresponding transmission configuration information as indicated in the message transmitted by the radio access network node at act 820 and may transmit traffic corresponding to another uplink traffic flow according to a second configured grant resource pattern and corresponding transmission configuration information as indicated in the message transmitted at act 820. The first configured grant resource pattern and corresponding transmission configuration information may be different from the second configured grant resource pattern and corresponding transmission configuration information.

Turning now to FIG. 9, the figure illustrates an example embodiment method 900 comprising at block 905 facilitating, by a radio access network node comprising a processor, receiving, from a user equipment, a communication session establishment message comprising a traffic flow indication indicative of at least one traffic flow corresponding to the communication session, wherein the at least one traffic flow is associated with at least one traffic flow characteristic; at block 910 based on the at least one traffic flow characteristic, facilitating, by the radio access network node, generating a configured grant configuration indication message comprising at least one configured grant pattern indication indicative of at least one configured grant resource pattern usable by the user equipment to transmit to the radio access network node uplink traffic corresponding to at least one of the at least one traffic flow; at block 915 facilitating, by the radio access network node, transmitting, to the user equipment, the configured grant configuration indication message; at block 920 facilitating, by the radio access network node, receiving, from the user equipment, uplink traffic corresponding to the at least one of the at least one traffic flow according to the at least one configured grant resource pattern; at block 925 facilitating, by the radio access network node, transmitting, to the user equipment, a configured grant resource pattern configuration comprising the at least one configured grant pattern indication being associated with the at least one configured grant resource pattern; at block 930 facilitating, by the radio access network node, transmitting, to the user equipment, a transmission configuration set configuration comprising at least one transmission configuration set identifier being associated with transmission configuration set information corresponding to at least one transmission configuration; and at block 935 wherein the configured grant configuration indication message further comprises at least one transmission configuration set identifier indicative of at least one transmission configuration to be used by the user equipment to transmit traffic to the radio access network node according to the at least one configured grant resource pattern.

Turning now to FIG. 10, the figure illustrates an example radio access network node, comprising at block 1005 a processor configured to receive, from a user equipment, a traffic flow indication indicative of at least one traffic flow corresponding to a communication session between the user equipment and the radio access network node, wherein the at least one traffic flow is associated with at least one traffic flow characteristic; at block 1010 based on the at least one traffic flow characteristic, transmit, to the user equipment, a configured grant configuration indication message comprising at least one configured grant pattern indication indicative of at least one configured grant resource pattern usable by the user equipment to transmit to the radio access network node uplink traffic corresponding to the at least one traffic flow; at block 1015 receive, from the user equipment, uplink traffic corresponding to the at least one traffic flow according to the at least one configured grant resource pattern; at block 1020 transmit, to the user equipment, a configured grant configuration comprising a configured grant resource pattern configuration that comprises the at least one configured grant pattern indication being associated with the at least one configured grant resource pattern and a transmission configuration set configuration comprising at least one transmission configuration set identifier being associated with transmission configuration set information corresponding to at least one transmission configuration; and at block 1025 wherein the at least one traffic flow comprises multiple traffic flows, and wherein the configured grant configuration comprises multiple configured grant pattern indications indicative of multiple corresponding configured grant resource patterns usable by the user equipment to transmit to the radio access network node uplink traffic corresponding to the multiple traffic flows.

Turning now to FIG. 11, the figure illustrates a non-transitory machine-readable medium 1100 comprising at block 1105 executable instructions that, when executed by a processor of a radio access network node, facilitate performance of operations, comprising transmitting, to a user equipment, a configured grant configuration comprising a configured grant resource pattern configuration that comprises at least one configured grant pattern indication being associated with at least one configured grant resource pattern and a transmission configuration set configuration comprising at least one transmission configuration set identifier being associated with transmission configuration set information corresponding to at least one transmission configuration; at block 1110 receiving, from a user equipment, a characteristic indication indicative of at least one characteristic corresponding to the user equipment; at block 1115 based on the at least one characteristic, transmitting, to the user equipment, a configured grant configuration indication message comprising at least one of at least one configured grant pattern indication indicative of at least one configured grant resource pattern usable by the user equipment to transmit to the radio access network node uplink traffic according to the at least one characteristic; at block 1120 receiving uplink traffic corresponding to at least one traffic flow according to the at least one configured grant resource pattern; at block 1125 wherein the at least one characteristic corresponding to the user equipment is at least one of: a quality parameter metric corresponding to the at least one traffic flow, a hardware configuration, a device type, or a flow identifier corresponding to the at least one traffic flow; and at block 1130, wherein the at least one traffic flow comprises multiple traffic flows, and wherein the configured grant configuration comprises multiple configured grant pattern indications indicative of multiple corresponding configured grant resource patterns usable by the user equipment to transmit to the radio access network node uplink traffic corresponding to the multiple traffic flows.

Figure 12:
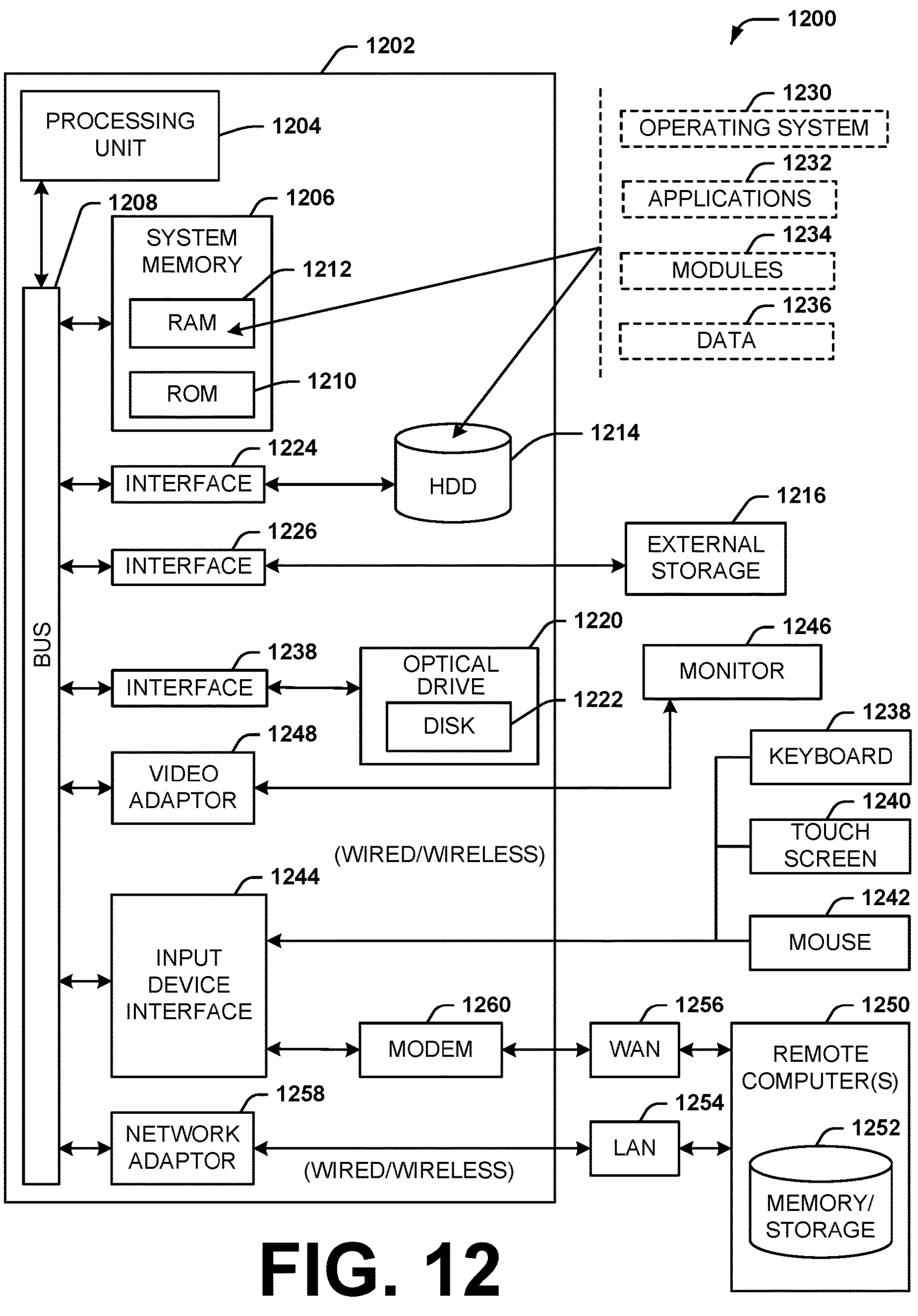
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1210. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
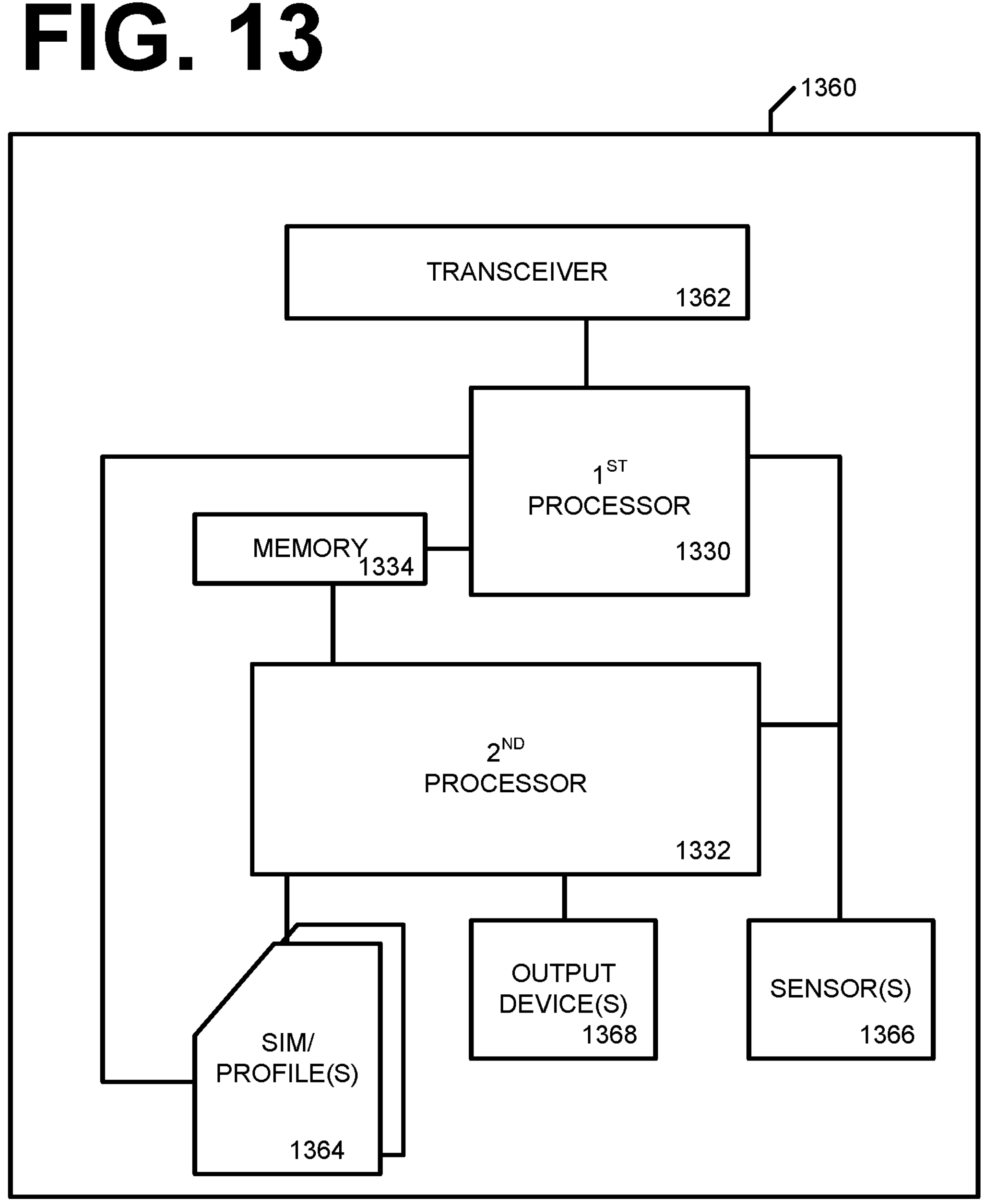
FIG. 13 illustrates a block diagram of an example wireless user equipment.

Turning now to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 34 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMSI") or information that may make up an IMSI.

SIM 1364 is shown coupled to both the first processor portion 1330 and the second processor portion 1332. Such an implementation may provide an advantage that first processor portion 30 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UE 1360.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| DTX | Discontinuous transmission |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio access network node comprising at least one processor, receiving, from a user equipment, a communication session establishment message comprising a traffic flow indication indicative of at least one traffic flow corresponding to the communication session, wherein the at least one traffic flow is associated with at least one traffic flow characteristic;

based on the at least one traffic flow characteristic, facilitating, by the radio access network node, generating a configured grant configuration indication message comprising at least one configured grant pattern indication indicative of at least one configured grant resource pattern usable by the user equipment to transmit to the radio access network node uplink traffic corresponding to at least one of the at least one traffic flow;

facilitating, by the radio access network node, transmitting, to the user equipment, the configured grant configuration indication message; and facilitating, by the radio access network node, receiving, from the user equipment, uplink traffic corresponding to the at least one of the at least one traffic flow according to the at least one configured grant resource pattern, wherein the at least one traffic flow comprises multiple different traffic flows, wherein the configured grant configuration is indicative of multiple different configured grant resource patterns, wherein, based on the configured grant configuration indication message, each of the multiple different configured grant resource patterns is used by the user equipment to exclusively transmit, to the radio access network node, uplink traffic corresponding to one of the multiple different traffic flows, wherein each of the at least one traffic flow characteristic comprises a quality-of-service associated with the each of the at least one traffic flow, and wherein the user equipment selects the at least one configured grant resource pattern, indicated by the configured grant configuration indication message, for transmission of the uplink traffic, corresponding to at least one traffic flow identifier indicated by the configured grant configuration indication message and based on at least one quality-of-service class indication, in the configured grant configuration indication message, associated with the at least one traffic flow identifier.

2. The method of claim 1, further comprising: facilitating, by the radio access network node, transmitting, to the user equipment, a configured grant resource pattern configuration comprising the at least one configured grant pattern indication being associated with the at least one configured grant resource pattern.

3. The method of claim 1, further comprising: facilitating, by the radio access network node, transmitting, to the user equipment, a transmission configuration set configuration comprising at least one transmission configuration set identifier being associated with transmission configuration set information corresponding to at least one transmission configuration.

4. The method of claim 3, wherein the transmission configuration set information comprises at least one of: a target bandwidth part identifier corresponding to a bandwidth part to be used for transmission of the uplink traffic corresponding to the at least one of the at least one traffic flow according to the at least one configured grant resource pattern, a default modulation and coding scheme, a number of uplink antenna streams to be used to transmit the at least one of the at least one traffic flow, a spatial diversity transmission mode indication indicative of a spatial diversity to be used to transmit the at least one of the at least one traffic flow, a transmission repetition transmission mode indication indicative of a transmission repetition scheme to be used to transmit the at least one of the at least one traffic flow, a spatial multi-stream transmission mode indication indicative of a spatial multi-stream transmission scheme to be used to transmit the at least one of the at least one traffic flow, or a retransmission mode indication indicative of a retransmission scheme to be used to transmit the at least one of the at least one traffic flow.

5. The method of claim 1, wherein the configured grant configuration indication message further comprises at least one transmission configuration set identifier indicative of at least one transmission configuration to be used by the user equipment to transmit traffic to the radio access network node according to the at least one configured grant resource pattern.

6. The method of claim 5, wherein the configured grant resource pattern configuration further comprises at least one traffic flow identifier, corresponding to the at least one of the at least one traffic flow, being associated with the at least one configured grant resource pattern, and wherein the at least one traffic flow identifier being associated with the at least one configured grant resource pattern is indicative that the at least one configured grant resource pattern is to be used by the user equipment to transmit uplink traffic corresponding to the at least one traffic flow identifier.

7. The method of claim 5, wherein the configured grant resource pattern configuration further comprises at least one quality of service class indication, corresponding to the at least one of the at least one traffic flow, being associated with the at least one configured grant resource pattern, and wherein the at least one quality of service class indication being associated with the at least one configured grant resource pattern is indicative that the at least one configured grant resource pattern is to be used by the user equipment to transmit uplink traffic corresponding to the at least one quality of service class indication.

8. The method of claim 1, wherein one of the different configured grant resource patterns is to be used exclusively with respect to the one of the multiple different traffic flows based on at least one traffic characteristic associated with the one of the multiple different traffic flows to be transmitted via the one of the different configured grant resource patterns.

9. A radio access network node, comprising:

at least one processor configured to:

receive, from a user equipment, a traffic flow indication indicative of at least one traffic flow corresponding to a communication session between the user equipment and the radio access network node, wherein the at least one traffic flow is associated with at least one traffic flow characteristic;

based on the at least one traffic flow characteristic, transmit, to the user equipment, a configured grant configuration indication message comprising at least one configured grant pattern indication indicative of at least one configured grant resource pattern usable by the user equipment to transmit to the radio access network node uplink traffic corresponding to the at least one traffic flow; and receive, from the user equipment, uplink traffic corresponding to the at least one traffic flow according to the at least one configured grant resource pattern, wherein the at least one traffic flow comprises multiple different traffic flows, wherein the configured grant configuration is indicative of multiple different configured grant resource patterns usable by the user equipment to transmit to the radio access network node uplink traffic corresponding to the multiple different traffic flows, wherein, based on the configured grant configuration indication message, respective ones of the multiple different configured grant resource patterns are used exclusively with respect to respective ones of the multiple different traffic flows, wherein each of the at least one traffic flow characteristic comprises a quality-of-service associated with the each of the at least one traffic flow, and wherein the user equipment selects the at least one configured grant resource pattern, indicated by the configured grant configuration indication message, for transmission of the uplink traffic, corresponding to at least one traffic flow identifier indicated by the configured grant configuration indication message and based on at least one quality-of-service class indication, in the configured grant configuration indication message, associated with the at least one traffic flow identifier.

10. The radio access network node of claim 9, wherein the at least one processor is further configured to:

transmit, to the user equipment, a configured grant configuration comprising a configured grant resource pattern configuration that comprises the at least one configured grant pattern indication being associated with the at least one configured grant resource pattern and a transmission configuration set configuration comprising at least one transmission configuration set identifier being associated with transmission configuration set information corresponding to at least one transmission configuration.

11. The radio access network node of claim 10, wherein the configured grant resource pattern configuration further comprises at least one traffic flow identifier, corresponding to the at least one traffic flow, being associated with the at least one configured grant resource pattern, and wherein the at least one traffic flow identifier being associated with the at least one configured grant resource pattern is indicative that the at least one configured grant resource pattern is to be used by the user equipment to transmit uplink traffic corresponding to the at least one traffic flow identifier.

12. The radio access network node of claim 10, wherein the configured grant resource pattern configuration further comprises at least one quality of service class indication, corresponding to at least one of the at least one traffic flow, being associated with the at least one configured grant resource pattern, and wherein the at least one quality of service class indication being associated with the at least one configured grant resource pattern is indicative that the at least one configured grant resource pattern is to be used by the user equipment to transmit uplink traffic corresponding to the at least one quality of service class indication.

13. The radio access network node of claim 9, wherein the configured grant configuration indication message further comprises at least one transmission configuration set identifier indicative of at least one transmission configuration to be used by the user equipment to transmit traffic to the radio access network node according to the at least one configured grant resource pattern.

14. The radio access network node of claim 9, wherein one of the multiple different configured grant resource patterns is to be used exclusively with respect to the one of the different traffic flows based on a quality-of-service associated with the one of the multiple different traffic flows to be transmitted via the one of the multiple different configured grant resource patterns.

15. A non-transitory machine-readable medium, comprising executable instructions that, when executed by at least one processor of a radio access network node, facilitate performance of operations, comprising:

transmitting, to a user equipment, a configured grant configuration comprising a configured grant resource pattern configuration that comprises at least one configured grant pattern indication being associated with at least one configured grant resource pattern and a transmission configuration set configuration comprising at least one transmission configuration set identifier being associated with transmission configuration set information corresponding to at least one transmission configuration;

receiving, from a user equipment, a characteristic indication indicative of at least one characteristic corresponding to the user equipment;

based on the at least one characteristic, transmitting, to the user equipment, a configured grant configuration indication message comprising at least one of at least one configured grant pattern indication indicative of at least one configured grant resource pattern usable by the user equipment to transmit to the radio access network node uplink traffic according to the at least one characteristic; and receiving uplink traffic corresponding to at least one traffic flow according to the at least one configured grant resource pattern, wherein the at least one traffic flow comprises multiple traffic flows, wherein the configured grant configuration comprises multiple configured grant pattern indications indicative of multiple corresponding configured grant resource patterns usable by the user equipment to transmit to the radio access network node uplink traffic corresponding to the multiple traffic flows, wherein the configured grant configuration indication message is indicative that different configured grant resource patterns of the multiple configured grant resource patterns are to be used by the user equipment to transmit, to the radio access network node, respectively corresponding different traffic flows of the multiple traffic flows, wherein, based on the configured grant configuration indication message, each of the different configured grant resource patterns is to be used exclusively for one of the different traffic flows, wherein each of the at least one characteristic comprises a quality-of-service associated with each of the multiple traffic flows, and wherein the user equipment selects the at least one configured grant resource pattern, indicated by the configured grant configuration indication message, for transmission of the uplink traffic, corresponding to at least one traffic flow identifier indicated by the configured grant configuration indication message and based on at least one quality-of-service class indication, in the configured grant configuration indication message, associated with the at least one traffic flow identifier.

16. The non-transitory machine-readable medium of claim 15, wherein the at least one characteristic corresponding to the user equipment is at least one of: a quality parameter metric corresponding to the at least one traffic flow, a hardware configuration, a device type, or a flow identifier corresponding to the at least one traffic flow.

17. The non-transitory machine-readable medium of claim 15, wherein the characteristic indication is indicative of the at least one characteristic corresponding to an anything reality application being executed by the user equipment.

18. The non-transitory machine-readable medium of claim 15, wherein the configured grant configuration further comprises multiple transmission configuration set indications of the at least one transmission configuration set indication indicative that the multiple transmission configuration set indications are to be used by the user equipment to transmit the different traffic flows of the multiple traffic flows to the radio access network node.

19. The non-transitory machine-readable medium of claim 15, wherein the configured grant resource pattern configuration further comprises different Quality-of-Service class indications being associated with the multiple configured grant resource patterns, wherein the configured grant configuration indication message is indicative that different configured grant resource patterns of the multiple configured grant resource patterns are to be used by the user equipment to transmit different traffic flows of the multiple traffic flows to the radio access network node based on correspondence of the different traffic flows to the different Quality-of-Service class indications.

20. The non-transitory machine-readable medium of claim 15, wherein one of the different configured grant resource patterns is to be used exclusively for the one of the different traffic flows based on a data rate corresponding to the one of the different traffic flows to be transmitted via the one of the different configured grant resource patterns.

* * * * *